(12) United States Patent
Korekoda

(10) Patent No.: US 9,385,559 B2
(45) Date of Patent: Jul. 5, 2016

(54) SEMICONDUCTOR DEVICE, POWER TRANSMISSION DEVICE, POWER RECEPTION DEVICE, CHARGING SYSTEM, WIRELESS COMMUNICATION SYSTEM, AND CHARGING METHOD

(71) Applicant: KABUSHIKI KAISHA TOSHIBA, Minato-ku (JP)

(72) Inventor: Hideaki Korekoda, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 463 days.

(21) Appl. No.: 13/945,302

(22) Filed: Jul. 18, 2013

(65) Prior Publication Data

US 2014/0028244 A1 Jan. 30, 2014

Related U.S. Application Data

(63) Continuation of application No. PCT/JP2012/050741, filed on Jan. 16, 2012.

(30) Foreign Application Priority Data

Jan. 20, 2011 (JP) ................................. 2011-009820

(51) Int. Cl.
*H02J 7/00* (2006.01)
*H02J 7/02* (2016.01)
(Continued)

(52) U.S. Cl.
CPC ............... *H02J 7/025* (2013.01); *B60L 11/182* (2013.01); *B60L 11/1812* (2013.01);
(Continued)

(58) Field of Classification Search
USPC ........................................................ 320/108
See application file for complete search history.

(56) References Cited

U.S. PATENT DOCUMENTS 8,004,118 B2 * 8/2011 Kamijo ................... H02J 7/025
307/104
8,400,105 B2 3/2013 Kondo
(Continued)

FOREIGN PATENT DOCUMENTS

JP 09-103037 4/1997
JP 2006-238548 9/2006
(Continued)

OTHER PUBLICATIONS

Office Action issued on Apr. 15, 2014 in the corresponding Japanese Patent Application No. 2012-553710 (with English Translation).
(Continued)

*Primary Examiner* — Robert Grant
(74) *Attorney, Agent, or Firm* — Oblon, McClelland, Maier & Neustadt, L.L.P.

(57) ABSTRACT

A semiconductor device transmits a wireless signal to a power reception device that charges a battery, transmits a charge completion signal when the battery charge is completed, and transmits a response signal in reply to a query signal in the wireless signal. The semiconductor device includes a drive control circuit, a reception circuit, and a controller. The controller can control, when the reception circuit does not receive the response signal or receives the charge completion signal, the drive control circuit to transmit communication capable power that makes it possible to communicate with the power reception device and control, when the reception circuit receives the response signal and does not receive the charge completion signal, the drive control circuit to transmit charging power capable of charging the battery of the power reception device by the wireless signal, the charging power being higher than the communication capable power.

9 Claims, 12 Drawing Sheets

(51) Int. Cl.
  *B60L 11/18*   (2006.01)
  *H01M 10/44*   (2006.01)
  *H01M 10/46*   (2006.01)
  *H02J 5/00*   (2016.01)

(52) U.S. Cl.
  CPC ............. *H01M 10/44* (2013.01); *H01M 10/46* (2013.01); *H02J 5/005* (2013.01); *B60L 2210/30* (2013.01); *B60L 2210/40* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01); *Y02T 90/16* (2013.01)

(56) References Cited

U.S. PATENT DOCUMENTS

| | | | |
|---|---|---|---|
| 2004/0145342 | A1 | 7/2004 | Lyon |
| 2009/0096413 | A1* | 4/2009 | Partovi .................... H01F 5/003 320/108 |
| 2010/0207575 | A1 | 8/2010 | Pijnenburg et al. |
| 2011/0127954 | A1* | 6/2011 | Walley ................ H01M 2/0267 320/108 |
| 2011/0169446 | A1* | 7/2011 | Kondo ............. H01M 10/4257 320/108 |

FOREIGN PATENT DOCUMENTS

| | | |
|---|---|---|
| JP | 2007-164801 | 6/2007 |
| JP | 2009-290931 | 12/2009 |
| JP | 2010-026756 | 2/2010 |
| JP | 2010-041363 | 2/2010 |
| WO | 2009/014125 | 1/2009 |
| WO | 2010/035545 | 4/2010 |

OTHER PUBLICATIONS

International Search Report issued on Apr. 24, 2012 for PCT/JP2012/050741 filed on Jan. 16, 2012 with English Translation.

Office Action issued Aug. 31, 2015 in Chinese Patent Application No. 201280008110.1 (with English language translation).

Office Action issued on May 29, 2014 in the corresponding Korean Patent Application No. 10-2013-7020344 (with English Translation).

Combined Chinese Office Action and Search Report issued Feb. 4, 2015 in Patent Application No. 201280008110.1 (with English language translation).

Combined Taiwanese Office Action and Search Report issued Dec. 24, 2013, in Taiwanese Patent Application No. 101102251 with English translation.

\* cited by examiner

SEMICONDUCTOR DEVICE, POWER TRANSMISSION DEVICE, POWER RECEPTION DEVICE, CHARGING SYSTEM, WIRELESS COMMUNICATION SYSTEM, AND CHARGING METHOD

CROSS REFERENCE TO RELATED APPLICATIONS

This application is a Continuation application of PCT Application No. PCT/JP2012/050741, filed Jan. 16, 2012 and based upon and claiming the benefit of priority from prior Japanese Patent Application No. 2011-009820, filed Jan. 20, 2011, the entire contents of all of which are incorporated herein by reference.

TECHNICAL FIELD

The present invention relates to a semiconductor device, a power transmission device, a power reception device, a charging system, a wireless communication system, and a charging method.

BACKGROUND ART

A non-contact charging system is used in a handset of a home cordless phone and the like. In the non-contact charging system, a coil (inductor) is included in each of a power transmission device on the power supply side and a power reception device on the power reception side, energy (electric power) transmitted from the power transmission device is transmitted to the power reception device by mutual induction, and a battery is charged by the transmitted energy.

In this system, the power transmission device cannot detect whether or not the power reception device is present. Therefore, even when the power reception device is not present, the power transmission device has to radiate charging power at all times, so that the power is wasted. Also, the power transmission device cannot obtain information of reception power limit (lower limit of power capable of charging a battery) and charge completion of the power reception device, so that the power transmission device transmits power under a predetermined certain transmission condition. Therefore, the relationship between the power transmission device and the power reception device is usually limited to one-to-one relationship of predetermined devices. Thus, the flexibility of the system is low.

CITATION LIST

Patent Literature

Patent Literature 1: Japanese Patent Application Laid-Open No. 2010-26756

SUMMARY OF INVENTION

Technical Problem

An object of the present invention is to provide a semiconductor device, a power transmission device, a power reception device, a charging system, a wireless communication system, and a charging method, which can effectively use power to charge a battery.

Solution to Problem

A semiconductor device transmits a wireless signal to a power reception device. The power reception device charges a battery obtained from the received wireless signal, transmits a charge completion signal when a charge of the battery is completed, and transmits a response signal in response to a query signal included in the wires signal. The semiconductor device includes a drive control circuit, a reception circuit a controller. The drive control circuit is configured to control a drive circuit configured to transmit the wireless signal from a transmission side coil to control intensity and modulation of the wireless signal. The reception circuit is configured to receive the response signal and the charge completion signal transmitted by the power reception device by modulating the wireless signal. The controller is configured to control, when the reception circuit does not receive the response signal or the reception circuit receives the charge completion signal, the drive control circuit to transmit communication capable power that makes it possible to communicate with the power reception device and the query signal from the transmission side coil by the wireless signal, and control, when the reception circuit receives the response signal and the reception circuit does not receive the charge completion signal, the drive control circuit to transmit charging power capable of charging the battery of the power reception device by the wireless signal from the transmission side coil, the charging power being higher than the communication capable power.

DESCRIPTION OF EMBODIMENTS

Hereinafter, embodiments of the present invention will be described with reference to the drawings. The embodiments do not limit the present invention.

First Embodiment

Figure 1:
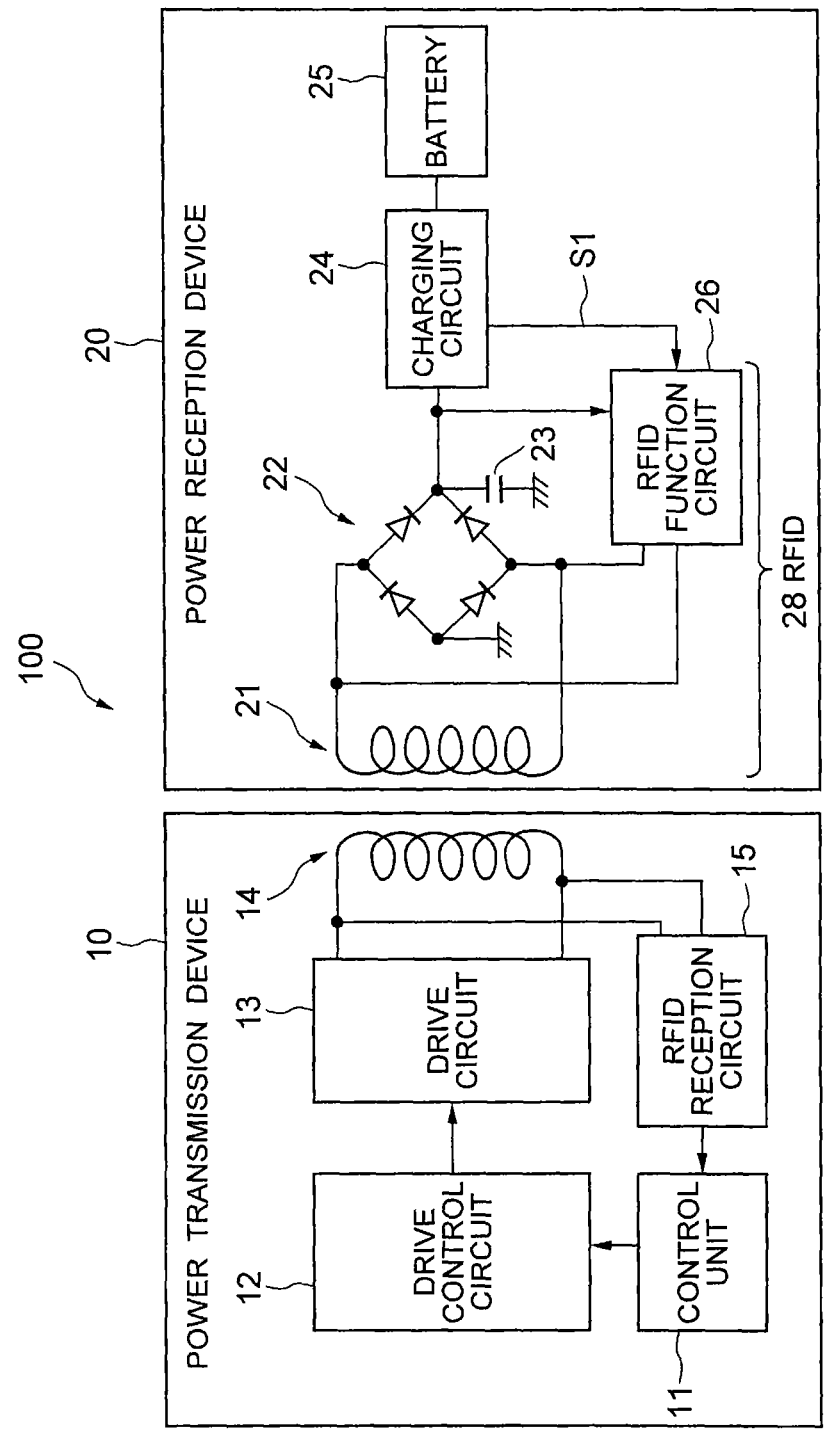
FIG. 1 is a block diagram showing a configuration of a charging system 100 according to a first embodiment of the present invention.

FIG. 1 is a block diagram showing a configuration of a charging system 100 according to a first embodiment of the present invention. As shown in FIG. 1, the charging system 100 (non-contact charging system) includes a power transmission device 10 and a power reception device 20.

The power transmission device 10 includes a control unit (for example, CPU) 11, a drive control circuit 12, a drive circuit 13, a transmission side coil 14, and an RFID (Radio Frequency Identification) reception circuit (reception circuit) 15. Among them, for example, the control unit 11, the drive control circuit 12, and the RFID reception circuit 15 can be formed as one semiconductor device (integrated circuit).

The power reception device 20 includes a reception side coil 21, a rectifier 22, a smoothing capacitor 23, a charging circuit 24, a battery (secondary cell) 25, and an RFID function circuit 26. Among them, for example, the rectifier 22, the smoothing capacitor 23, the charging circuit 24, and the RFID function circuit 26 can be formed as one semiconductor device. Also among them, the reception side coil 21, the rectifier 22, the smoothing capacitor 23, and the RFID function circuit 26 function as an RFID 28.

The power transmission device 10 transmits power by using a wireless signal. The power reception device 20 receives the wireless signal transmitted from the power transmission device 10 and charges the battery 25 by power obtained from the received wireless signal.

The transmission side coil 14 transmits the wireless signal. The drive circuit 13 drives the transmission side coil 14 to cause the transmission side coil 14 to transmit the wireless signal. The drive control circuit 12 controls the drive circuit 13 to control the intensity and modulation of the wireless signal. The drive control circuit 12 controls the intensity of the wireless signal, so that the power transmitted by the wireless signal is controlled. Also, the drive control circuit 12 controls the modulation of the wireless signal, so that a predetermined query signal (command) is transmitted by the wireless signal.

When the drive control circuit 12 does not modulate the wireless signal, the RFID reception circuit 15 receives a response signal and a charge completion signal, which are transmitted by the power reception device 20 by modulating the wireless signal, through the transmission side coil 14.

The control unit 11 interprets the response signal and the charge completion signal received by the RFID reception circuit 15 and performs a corresponding process. Specifically, when the RFID reception circuit 15 does not receive the response signal or when the RFID reception circuit 15 receives the charge completion signal, the control unit 11 controls the drive control circuit 12 to cause the transmission side coil 14 to transmit communication capable power that makes it possible to communicate with the power reception device 20 and the query signal by the wireless signal.

The communication capable power is power that can communicate with the power reception device 20. In other words, the communication capable power is power that can operate the power reception device 20. Further, the communication capable power corresponds to the intensity of the wireless signal by which the query signal transmitted from the power transmission device 10 can be normally received by the power reception device 20. The query signal includes a command capable of checking the presence of the power reception device 20 and is a signal for requesting the power reception device 20 to transmit a response signal.

When the RFID reception circuit 15 receives the response signal and does not receive the charge completion signal, the control unit 11 controls the drive control circuit 12 to cause the transmission side coil 14 to transmit charging power capable of charging the battery 25 of the power reception device 20 by the wireless signal.

The charging power is higher than the communication capable power. At this time, the control unit 11 controls the intensity of the wireless signal (that is, the charging power) on the basis of identification information of the battery 25 included in the response signal received by the RFID reception circuit 15.

A more detailed circuit configuration of the power transmission device 10 will be described later.

The reception side coil 21 receives the wireless signal from the power transmission device 10. The rectifier 22 rectifies the wireless signal received by the reception side coil 21 and generates power. In the present embodiment, as an example of the rectifier 22, a bridge diode in which four diodes are connected is used. That is to say, in the present embodiment, the rectifier 22 full-wave rectifies the wireless signal. The smoothing capacitor 23 smoothes the rectified power.

The charging circuit 24 charges the battery 25 by the smoothed power from the rectifier 22. When the charging of the battery 25 is completed, the charging circuit 24 outputs a completion signal S1.

The RFID function circuit 26 operates by the smoothed power from the rectifier 22. When the RFID function circuit 26 demodulates the wireless signal received by the reception side coil 21 and detects the query signal from the wireless signal, the RFID function circuit 26 modulates the wireless signal transmitted from the power transmission device 10 and transmits the response signal from the reception side coil 21. The RFID function circuit 26 includes a memory (not shown in the drawings) and the memory stores the aforementioned identification information of the battery 25 and the like. Thereby, the RFID function circuit 26 can add the identification information of the battery 25 and the like to the response signal. The identification information may be stored in the memory in the RFID function circuit 26, for example, according to the type of the battery 25 when manufacturing the power reception device 20.

When the RFID function circuit 26 receives the completion signal S1 from the charging circuit 24, the RFID function circuit 26 modulates the wireless signal and transmits the charge completion signal from the reception side coil 21.

The modulation by the RFID function circuit 26 is performed as described below. When the RFID function circuit 26 modulates the wireless signal, the RFID function circuit 26 draws a current from the reception side coil 21. Then, a current flows to the RFID function circuit 26 from the reception side coil 21 in addition to a current flowing from the reception side coil 21 to the rectifier 22 by the received wireless signal. Thereby, the intensity of the wireless signal transmitted from the power transmission device 10 decreases and the wireless signal is amplitude-modulated. As described above, the RFID reception circuit 15 of the power transmission device 10 receives the response signal and the charge completion signal from the wireless signal modulated in this way.

The communication scheme (communications standard) of the RFID 28 may be any scheme by which the communication between the power transmission device 10 and the power reception device 20 can be performed.

Next, an example of a detailed circuit configuration of the power transmission device 10 will be described with reference to FIG. 2.

Figure 2:
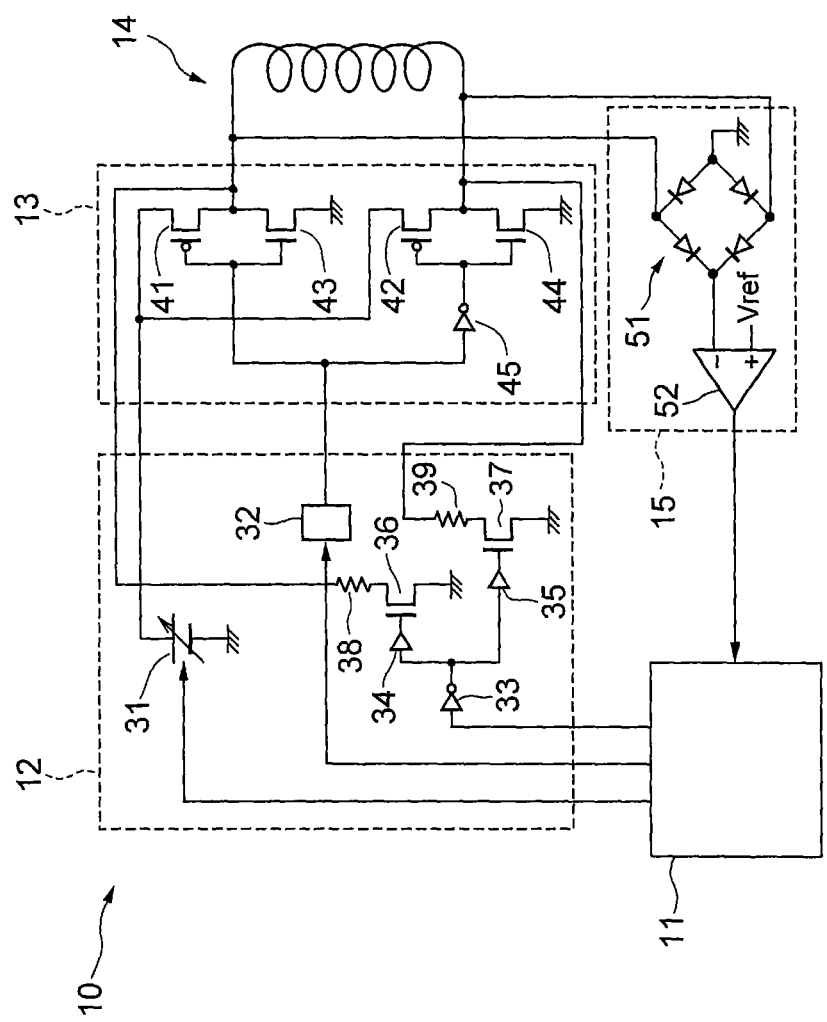
FIG. 2 is a circuit diagram showing a configuration of the power transmission device 10 according to the first embodiment of the present invention.

FIG. 2 is a circuit diagram showing a configuration of the power transmission device 10 according to the first embodiment of the present invention. As shown in FIG. 2, the drive control circuit 12 includes a variable power supply 31, an oscillator 32, an inverter 33, buffers 34 and 35, an NMOS transistor (first NMOS transistor) 36, an NMOS transistor (second NMOS transistor) 37, and resistances 38 and 39.

The drive circuit 13 includes PMOS transistors 41 and 42, NMOS transistors 43 and 44, and an inverter 45. The RFID reception circuit 15 includes a rectifier (transmission side rectifier) 51 and a comparator 52.

A modulation control signal from the control circuit 11 is inputted into the inverter 33. The output signal of the inverter 33 is inputted into the gate of the NMOS transistor 36 through the buffer 34 and also inputted into the gate of the NMOS transistor 37 through the buffer 35.

Regarding the NMOS transistor 36, the source is grounded and the drain is connected to one end of the transmission side coil 14 through the resistance 38. Regarding the NMOS transistor 37, the source is grounded and the drain is connected to the other end of the transmission side coil 14 through the resistance 39.

The oscillator 32 outputs an oscillation signal having a frequency based on a frequency control signal from the control circuit 11 to the gate of the PMOS transistor 41, the gate of the NMOS transistor 43, and the inverter 45. The output signal of the inverter 45 is inputted into the gate of the PMOS transistor 42 and the gate of the NMOS transistor 44.

An intensity control signal from the control circuit 11 is inputted into the variable power supply 31.

A voltage from the variable power supply 31 is supplied to the source of the PMOS transistor 41, and the drain and the gate thereof are connected to the drain and the gate of the NMOS transistor 43, respectively. The source of the NMOS transistor 43 is grounded. A connection point between the drain of the PMOS transistor 41 and the drain of the NMOS transistor 43 is connected to one end of the transmission side coil 14. That is to say, the PMOS transistor 41 and the NMOS transistor 43 form a first drive inverter.

The voltage from the variable power supply 31 is supplied to the source of the PMOS transistor 42, and the drain and the gate thereof are connected to the drain and the gate of the NMOS transistor 44, respectively. The source of the NMOS transistor 44 is grounded. A connection point between the drain of the PMOS transistor 42 and the drain of the NMOS transistor 44 is connected to the other end of the transmission side coil 14. That is to say, the PMOS transistor 42 and the NMOS transistor 44 form a second drive inverter.

The one end and the other end of the transmission side coil 14 are connected to the rectifier 51. In the present embodiment, as an example of the rectifier 51, a bridge diode in which four diodes are connected is used. A signal from the transmission side coil 14, which is rectified by the rectifier 51, is inputted into the inverting input terminal of the comparator 52. A reference voltage Vref is inputted into the input terminal of the comparator 52. The output signal of the comparator 52 is inputted into the control unit 11.

On the basis of the oscillation signal from the oscillator 32, the first drive inverter and the second drive inverter drive the transmission side coil 14 by signals having phases reverse to each other. Thereby, the wireless signal is transmitted from the transmission side coil 14. The frequency of the oscillation signal (the frequency of the wireless signal) can be arbitrarily set to, for example, 125 kHz, 13.56 MHz, and the like, according to a communication scheme.

The voltage of the variable power supply 31 is controlled according to the intensity control signal from the control unit 11. The voltage amplitudes of the output signals of the first drive inverter and the second drive inverter depend on the voltage of the variable power supply 31, so that the intensity of the wireless signal transmitted from the transmission side coil 14 is controlled by the voltage of the variable power supply 31.

The NMOS transistors 36 and 37 are controlled to be turned on or off according to the modulation control signal from the control circuit 11. When the NMOS transistors 36 and 37 are turned on, a current flows from the transmission side coil 14 to the NMOS transistors 36 and 37, and the voltage amplitudes of the output signals of the first drive inverter and the second drive inverter decrease. Thereby, the modulation of the wireless signal transmitted from the transmission side coil 14 is controlled. In the present embodiment, it is assumed that the wireless signal is amplitude-modulated.

As described above, the control unit 11 controls, by using the intensity control signal and the modulation control signal, the drive control circuit 12 to cause the transmission side coil 14 to transmit predetermined power and signal by the wireless signal.

The rectifier 51 rectifies the wireless signal, which is modulated by the power reception device 20, from the transmission side coil 14. The comparator 53 compares the rectified signal with the reference voltage Vref and outputs a comparison result to the control unit 11. The comparison result includes the response signal and the charge completion signal. In this way, as described above, the RFID reception circuit 15 receives the response signal and the charge completion signal from the wireless signal modulated by the power reception device 20.

Next, operations of the power transmission device 10 and the power reception device 20 will be described with reference to flowcharts in FIGS. 3 and 4. Thereafter, a relationship between the operation of the power transmission device 10 and the operation of the power reception device 20 will be described with reference to a sequence diagram in FIG. 5.

Figure 3:
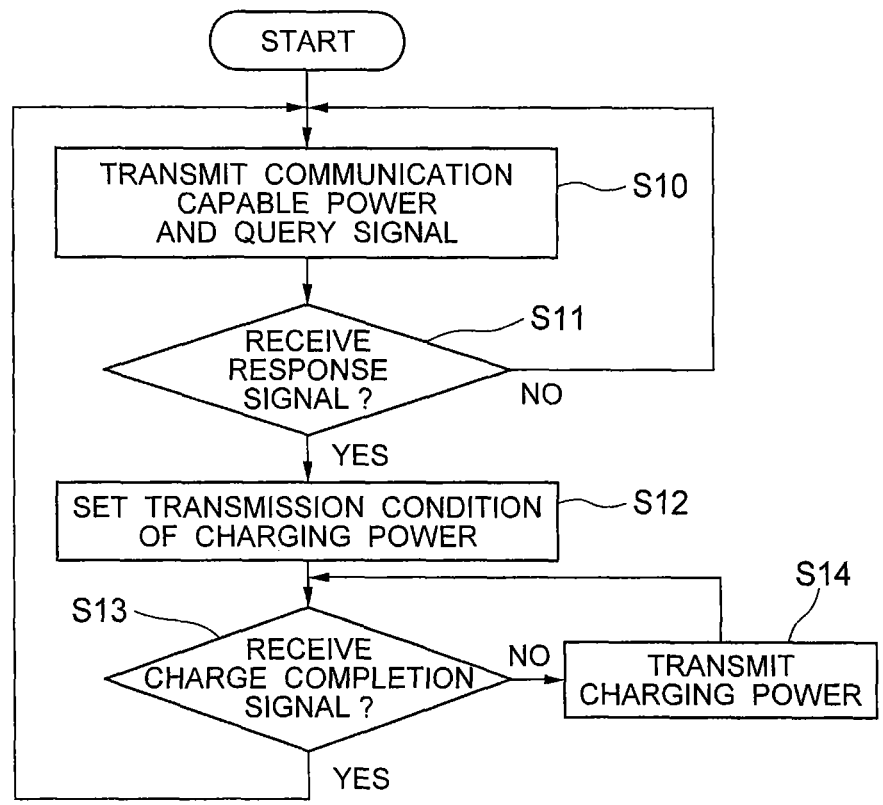
FIG. 3 is the flowchart showing the operation of the power transmission device 10 according to the first embodiment of the present invention.

FIG. 3 is the flowchart showing the operation of the power transmission device 10 according to the first embodiment of the present invention.

First, the power transmission device 10 transmits the communication capable power and the query signal by using the wireless signal (step S10). As described above, the communication capable power is power sufficiently lower than the charging power for charging the battery 25. The query signal is transmitted intermittently. For example, the power transmission device 10 repeats transmitting a non-modulated wireless signal for 10 seconds and thereafter amplitude-modulating the wireless signal and transmitting the query signal for 0.1 second. The communication capable power is transmitted by the non-modulated wireless signal and the amplitude-modulated wireless signal.

Next, after transmitting the query signal, the power transmission device 10 determines whether or not the response signal is received from the power reception device 20 (step S11). The determination is performed while transmitting the aforementioned non-modulated signal.

When the response signal is not received (step S11: No), the power transmission device 10 returns to the process of step S10. Thereby, when the power transmission device 10 cannot receive the response signal because of a reason that the power reception device 20 is not located nearby or the like, the power transmission device 10 continuously transmits the communication capable power and the query signal.

When the response signal is received (step S11: Yes), the power transmission device 10 subsequently sets a transmission condition of the charging power (step S12). When the response signal is transmitted from the power reception device 20, the non-modulated wireless signal transmitted from the power transmission device 10 is amplitude-modulated by the power reception device 20. The power transmission device 10 can receive the response signal by receiving the amplitude-modulated wireless signal by the RFID reception circuit 15.

As described above, the power transmission device 10 sets the transmission condition of the charging power on the basis of the identification information of the battery 25 included in the response signal. For example, the control unit 11 of the power transmission device 10 has a map (table) including a plurality of pairs of identification information and charge characteristic information associated with each other, and can set the transmission condition of the charging power according to the charge characteristic information corresponding to the received identification information. For example, the charge characteristic information includes a relationship between the charging power and time (a charging profile). Thereby, according to the characteristics of the battery 25, for example, it is possible to decrease the charging power not to rapidly charge the battery 25 immediately after the start of the charge and increase the charging power after a certain period of time has elapsed. Also it is possible to transmit charging power according to a lower limit of the charging power of the battery 25. It is possible to reduce the radiation of the wireless signal (electromagnetic wave) by the control described above, so that the electromagnetic interference can be reduced.

Next, the power transmission device 10 determines whether or not the charge completion signal is received from the power reception device 20 (step S13).

When the charge completion signal is received (step S13: Yes), the power transmission device 10 returns to the process of step S10.

When the charge completion signal is not received (step S13: No), the power transmission device 10 transmits the charging power under the set transmission condition (step S14) and returns to the determination of step S13. Thereby, the power transmission device 10 continuously transmits the charging power until the charge completion signal is received. In the present embodiment, while the charging power is transmitted, the query signal is not transmitted.

Figure 4:
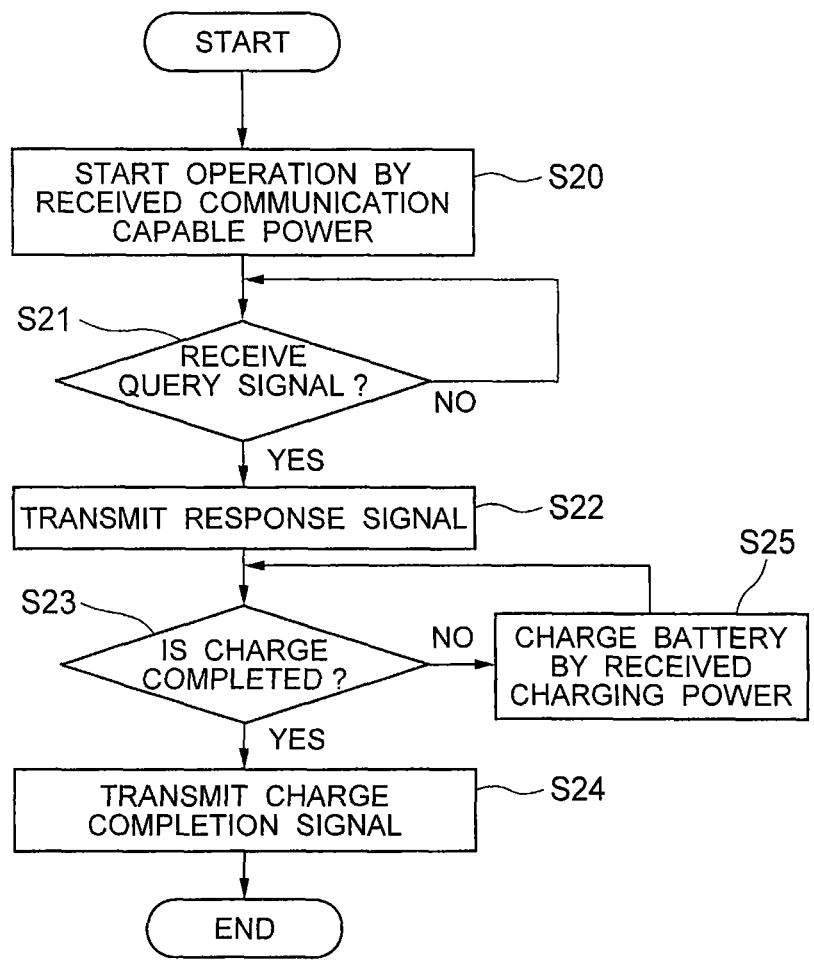
FIG. 4 is the flowchart showing the operation of the power reception device 20 according to the first embodiment of the present invention.

FIG. 4 is the flowchart showing the operation of the power reception device 20 according to the first embodiment of the present invention.

First, the power reception device 20 receives the communication capable power transmitted from the power transmission device 10 and starts the operation (step S20). Specifically, the RFID function circuit 26 is activated by the communication capable power.

Next, the power reception device 20 determines whether or not the query signal is received from the power transmission device 10 (step S21).

When the query signal is not received (step S21: No), the power reception device 21 returns to the determination of step S21.

When the query signal is received (step S21: Yes), the power reception device 20 transmits the response signal by using the wireless signal in response to the query signal (step S22).

Next, the power reception device 20 determines whether or not the charging of the battery 25 is completed (step S23).

When the charging is completed (step S23: Yes), the power reception device 20 transmits the charge completion signal by using the wireless signal and ends the process.

When the charging is not completed (step S23: No), the power reception device 20 charges the battery 25 by the received charging power (step S25) and returns to the determination of step S23.

Figure 5:
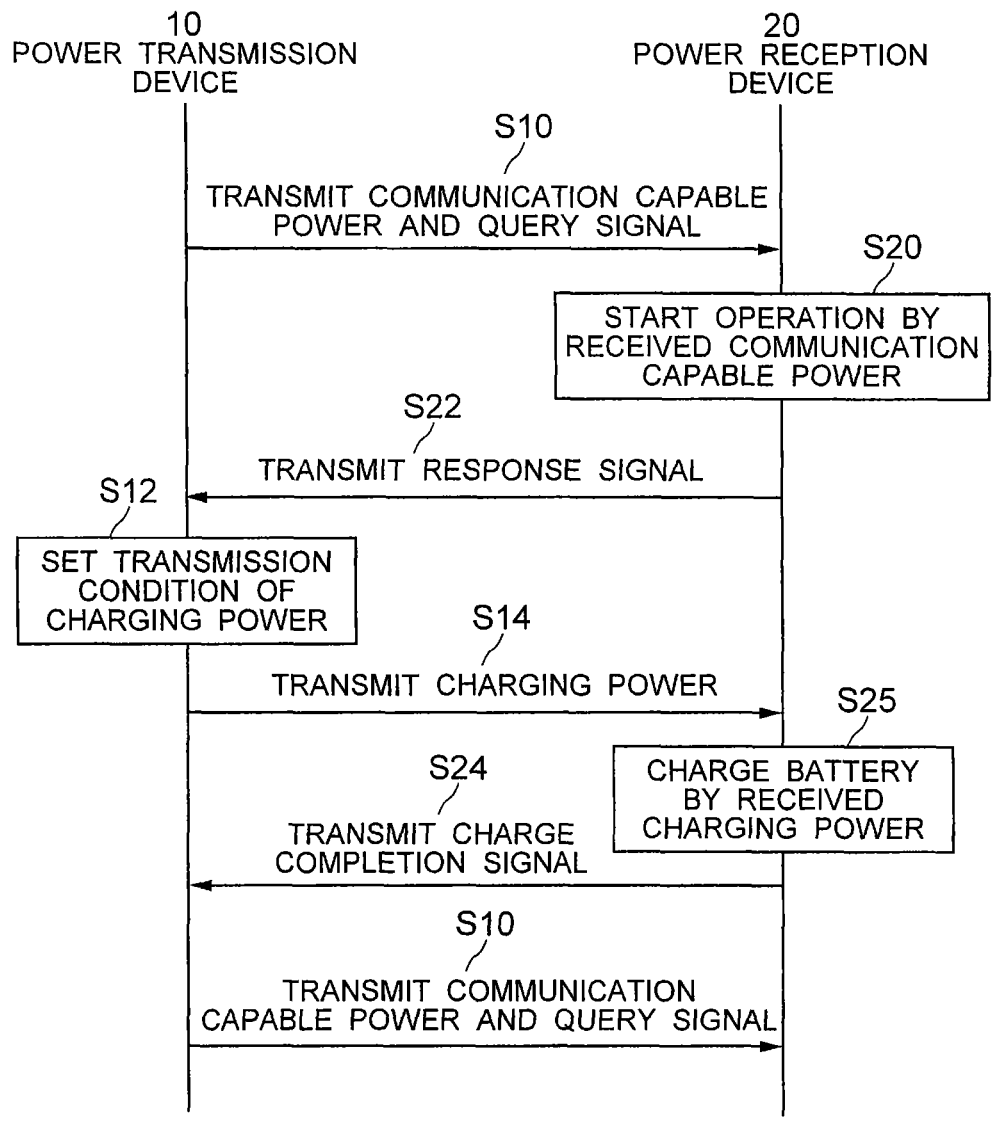
FIG. 5 is a sequence diagram showing the operation of the charging system according to the first embodiment of the present invention.

Next, the relationship between the operation of the power transmission device 10 and the operation of the power reception device 20 (that is to say, the operation of the charging system 100) will be described with reference to the sequence diagram in FIG. 5. Here, an example will be described where the battery 25 which has not been charged is charged. The steps described below correspond to the steps in the flowcharts in FIGS. 3 and 4.

First, after power-on of the power transmission device 10, the power transmission device 10 transmits the communication capable power and the query signal which can communicate with the power reception device 20 by using the wireless signal (step S10).

Next, the power reception device 20 starts the operation by the communication capable power received from the power transmission device 10 (step S20) and transmits the response signal by using the wireless signal in response to the query signal received from the power transmission device 10 (step S22).

Next, the power transmission device 10 sets the transmission condition of the charging power (step S12).

Subsequently, when the power transmission device 10 receives the response signal from the power reception device 20 and does not receive the charge completion signal, the power transmission device 10 increases the intensity of the wireless signal to be transmitted according to the set transmission condition of the charging power and transmits the charging power by using the wireless signal (step S14).

Next, when the charging of the battery 25 is not completed, the power reception device 20 charges the battery 25 by the received charging power (step S25). At this time, the power transmission device 10 continuously transmits the charging power under the set transmission condition until the charge completion signal is received (step S13: No, step S14).

Next, when the charging of the battery 25 is completed, the power reception device 20 transmits the charge completion signal by using the wireless signal (step S24).

When the power transmission device 10 receives the charge completion signal from the power reception device 20, the power reception device 10 decreases again the intensity of the wireless signal to be transmitted and transmits the communication capable power and the query signal which are lower than the charging power by using the wireless signal (step S10). Thereby, it is possible not to transmit useless power that is not used for the charging when the charging of the battery 25 need not be performed.

As described above, according to the present embodiment, communication is performed between the RFID reception circuit 15 of the power transmission device 10 and the RFID 28 of the power reception device 20, so that the power transmission device 10 can know the presence and information of the power reception device 20. Thereby, the power transmission device 10 can transmit only the minimum necessary communication capable power to communicate with the RFID 28 of the power reception device 20 until the power transmission device 10 confirms the presence of the power reception device 20 and the charging of the battery 25 of the power reception device 20 becomes necessary. As a result, the power transmission device 10 need not transmit the charging power necessary to charge the battery 25 at all times, so that it is possible to reduce useless power that is not used effectively. Therefore, it is possible to effectively use the power to charge the battery.

The power transmission device 10 can receive the identification information of the battery 25 transmitted from the RFID 28 of the power reception device 20, so that the power transmission device 10 can set an appropriate transmission condition of the charging power on the basis of the identification information. Therefore, even when the types and the charging conditions of the power reception device 20 (battery 25) to be charged increase, the power transmission device 10 can transmit the charging power suitable for each power reception device 20. As a result, it is possible to increase the flexibility of the charging system 100.

In the above description, an example is described in which the power transmission device 10 does not transmit the query signal while transmitting the charging power. However, the power transmission device 10 may intermittently transmit the query signal while transmitting the charging power. In this case, when the power reception device 20 receives the query signal while charging the battery 25, the power reception device 20 transmits the response signal. When the power transmission device 10 does not receive the response signal after transmitting the query signal, the power transmission device 10 stops the transmission of the charging power and transmits the communication capable power. Thereby, when the power reception device 20 disappears while the battery 25 is being charged and before the charging is completed, the power transmission device 10 can immediately stop the transmission of the charging power. Therefore, it is possible to further reduce the useless power.

Second Embodiment

In a second embodiment, the RFID function circuit 26 of the power reception device 20 is operated by the power of the battery 25.

Figure 6:
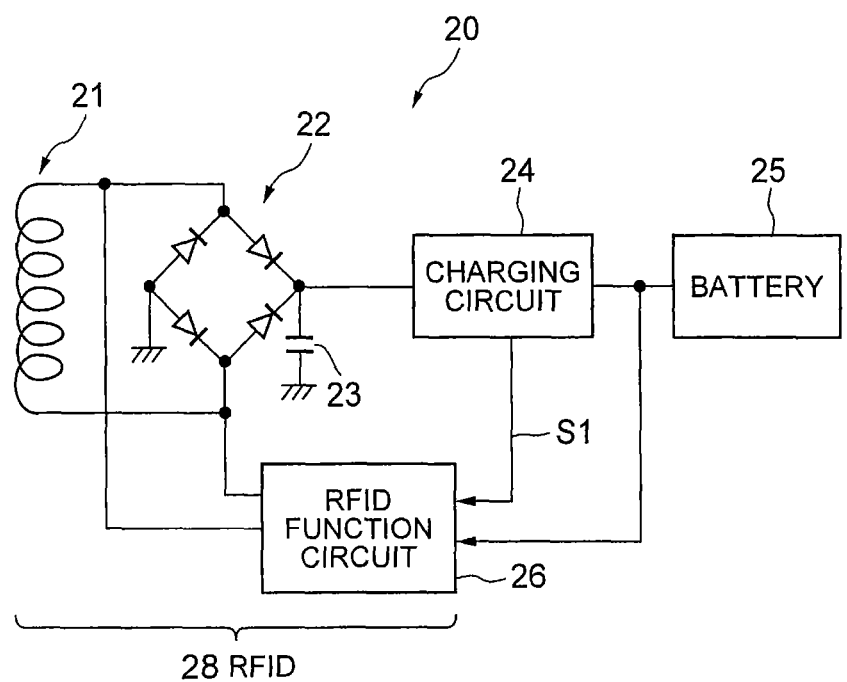
FIG. 6 is a block diagram showing a configuration of a power reception device 20 according to the second embodiment of the present invention.

FIG. 6 is a block diagram showing a configuration of a power reception device 20 according to the second embodiment of the present invention. As shown in FIG. 6, the power reception device 20 is different from that of the first embodiment shown in FIG. 1 in a point that the power is supplied from the battery 25 to the RFID function circuit 26 while the power is not supplied from the rectifier 22 to the RFID function circuit 26. The other components are the same as those in the first embodiment shown in FIG. 1, so that the same components are denoted by the same reference numerals and the description thereof will be omitted.

In the charging system 100 that uses such a power reception device 20, the power transmission device 10 need not transmit power for operating the RFID function circuit 26 when not charging the battery 25. Therefore, the power transmission device 10 decreases the intensity of the wireless signal transmitted at this time to lower than that in the first embodiment, so that the power transmission device 10 can transmit the communication capable power and the query signal, the communication capable power being lower than those in the first embodiment.

The communication capable power corresponds to the intensity of the wireless signal by which the query signal transmitted from the power transmission device 10 can be normally received by the power reception device 20. Also, the communication capable power corresponds to the intensity of the wireless signal by which the non-modulated wireless signal transmitted from the power transmission device 10 can be modulated by the power reception device 20 and the wireless signal modulated by the power reception device 20 can be received by the power transmission device 10.

As described above, according to the present embodiment, it is possible to reduce, when the power transmission device 10 does not charge the battery 25, the power transmitted by the power transmission device 10 lower than that in the first embodiment. Therefore, it is possible to reduce the electromagnetic interference more than that in the first embodiment. Further, it is possible to obtain the same effect as that in the first embodiment.

The RFID function circuit 26 may be supplied power by a dedicated battery different from the battery 25.

Third Embodiment

In a third embodiment, the power transmission device 10 has an RFID write function in addition to an RFID read function of the first embodiment, and the power transmission device 10 writes information to the RFID function circuit 26 of the power reception device 20.

For example, the power transmission device 10 of the present embodiment transmits a signal for writing the number of times of charging before starting the transmission of the charging power. When the power reception device 20 receives the signal for writing the number of times of charging, the power reception device 20 adds 1 to the number of times of charging stored in the memory included in the RFID function circuit 26 and stores the added number of times of charging. Thereby, when the number of times of charging exceeds a predetermined number of times, the power reception device 20 can notify a user accordingly by using a lamp, a display, or the like.

In this way, according to the present embodiment, the RFID function circuit 26 of the power reception device 20 stores the number of times of charging, so that the user can know the life of the battery 25. Further, it is possible to obtain the same effect as that in the first embodiment.

Fourth Embodiment

In the first to the third embodiments, an example is described in which the power transmission device 10 transmits the communication capable power, the charging power, and a command such as the query signal by using the wireless signal of a certain frequency. However, in the present embodiment, the frequency used to transmit and receive the communication capable power and the charging power is different from the frequency used to transmit and receive a command such as the query signal.

In the present embodiment, the power transmission device 10 further includes an additional transmission side coil connected in parallel with the transmission side coil 14. The drive circuit 13 drives the transmission side coil 14 and the additional transmission side coil. For example, the power transmission device 10 transmits the communication capable power and the charging power from the transmission side coil 14 by using the wireless signal of 125 kHz and transmits a command such as the query signal from the additional transmission side coil by using the wireless signal of 13.56 MHz.

The power reception device 20 further includes an additional reception side coil connected in parallel with the reception side coil 21. For example, the power reception device 20 obtains the communication capable power and the charging power by using the wireless signal of 125 kHz received by the reception side coil 21 and detects a command such as the query signal by using the wireless signal of 13.56 MHz received by the additional reception side coil.

It is possible to obtain the same effects as those in the first to the third embodiments by the configuration as described above.

Fifth Embodiment

The present embodiment relates to a charging system in which a plurality of power reception devices can be charged by one power transmission device.

Figure 7:
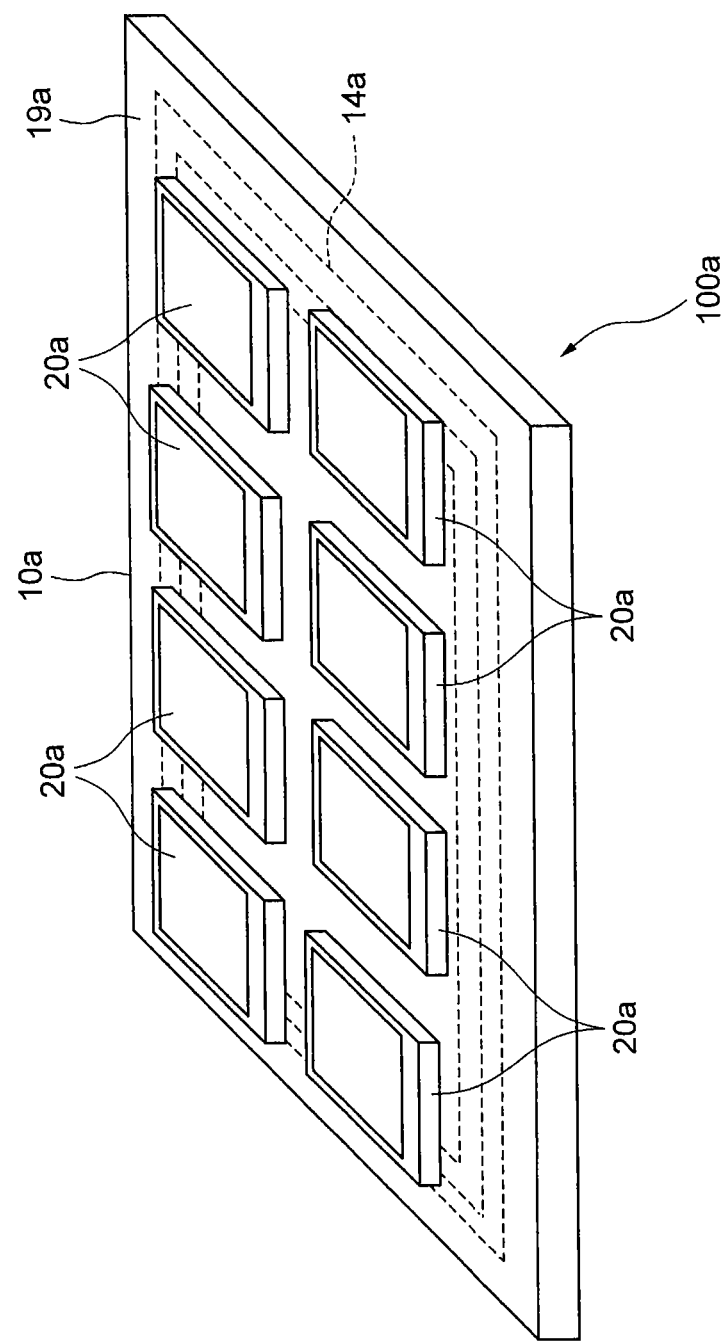
FIG. 7 is a perspective view of a charging system 100a according to a fifth embodiment.
Figure 8:
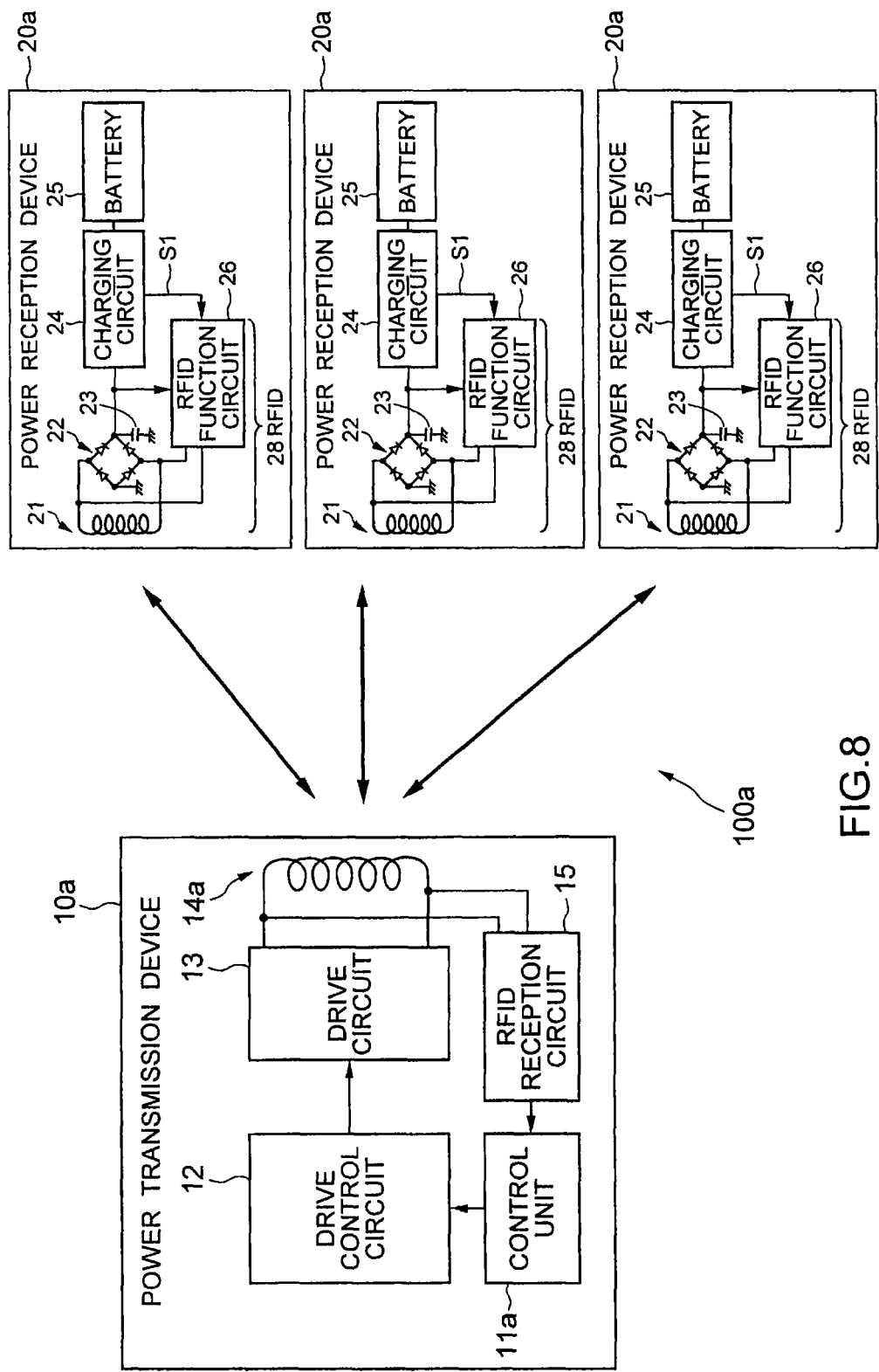
FIG. 8 is a block diagram showing a configuration of the charging system 100a according to the fifth embodiment.

FIG. 7 is a perspective view of a charging system 100a according to a fifth embodiment. FIG. 8 is a block diagram showing a configuration of the charging system 100a according to the fifth embodiment. As shown in FIGS. 7 and 8, the charging system 100a includes a power transmission device 10a and a plurality of power reception devices 20a. For example, the power reception device 20 may be configured as a mobile terminal. As shown in FIG. 7, the power transmission device 10a has, for example, a flat plate shape, and a plurality of power reception devices 20a can be placed on the surface 19a of the power transmission device 10a. A transmission side coil 14a is embedded in the surface 19a of the power transmission device 10a. As shown in FIG. 8, the configurations of the power transmission device 10a and the power reception device 20a are basically the same as those shown in FIG. 1.

In the charging system 100a, the control unit 11a of the power transmission device 10a acquires identification information of the batteries 25 of the power reception devices 20a by using an anti-collision (collision prevention) function of the RFID. The control unit 11a of the power transmission device 10a controls the charging power according to the acquired identification information of the batteries 25 of the power reception devices 20a.

For example, a specific operation in the case in which the power transmission device 10a can charge ten power reception devices 20a at most will be described. When two power reception devices 20a are placed on the power transmission device 10a, the power transmission device 10a can transmit the sum of power required by the power reception devices 20a as transmission power according to the identification information of the batteries 25 of the two power reception devices 20a. Therefore, the power transmission device 10a need not transmit useless transmission power, so that it is possible to reduce the power consumption and the electromagnetic interference. The identification information of the battery 25, that is, the required power, may be different for each power reception device 20a.

On the other hand, in a conventional charging system that can charge a plurality of power reception devices, for example, when the power transmission device is configured to be able to charge ten power reception devices at most, the power transmission device continuously transmits power that can charge ten power reception devices regardless of the power reception devices. Therefore, for example, when two power reception devices are placed, each power reception device that receives, for example, a half of all the transmitted power internally consumes most of the received power as heat or the like. In this way, the conventional power transmission device has to transmit useless power that is not used to charge battery.

For example, in the charging system 100a, the transmission side coil 14a of the power transmission device 10a may be buried in a road near an intersection and the power reception device 20a may be mounted in a vehicle. In this case, the power reception device 20a can be charged while the vehicle waits for the traffic light to change.

Sixth Embodiment

The present embodiment relates to a wireless communication system that uses the power transmission device 10 and the power reception device 20.

Figure 9:
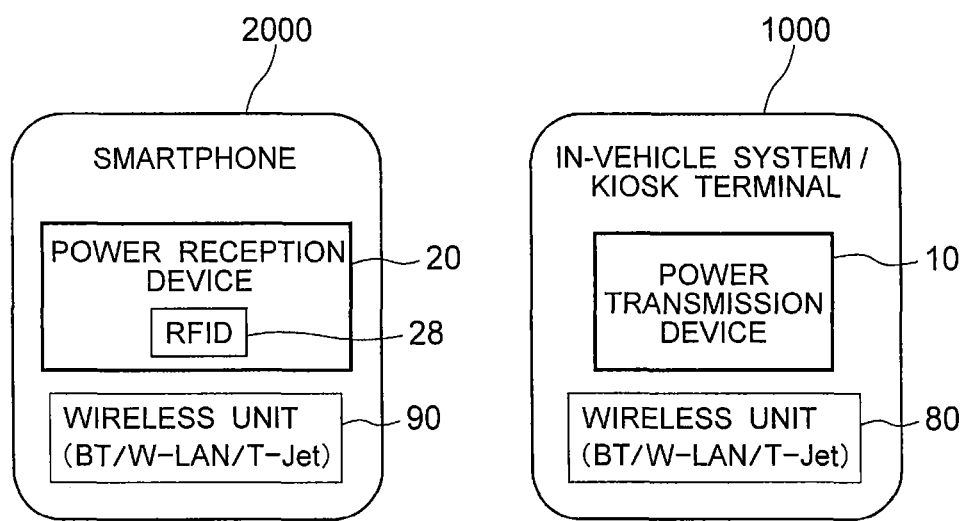
FIG. 9 is a block diagram showing a configuration of the wireless communication system according to the sixth embodiment.

FIG. 9 is a block diagram showing a configuration of the wireless communication system according to the sixth embodiment. The wireless communication system includes a first wireless communication device 1000 and a second wireless communication device 2000. The first wireless communication device 1000 is, for example, an in-vehicle system mounted in a vehicle or a kiosk terminal. The second wireless communication device 2000 is, for example, a smartphone.

The first wireless communication device 1000 includes the power transmission device 10 of the first embodiment and a first wireless unit 80.

The second wireless communication device 2000 includes the power reception device 20 of the first embodiment and a second wireless unit 90. The second wireless communication device 2000 operates by power of the battery 25 of the power reception device 20 or power from the rectifier 22. The second wireless unit 90 is configured to be able to wirelessly communicate with the first wireless unit 80.

The first and the second wireless units 80 and 90 are compliant with, for example, at least one of the following communication standards: BT: Bluetooth (registered trademark), W-LAN: Wireless LAN, and T-Jet: TransferJet (registered trademark).

Hereinafter, an operation of the wireless communication system will be described with reference to sequence diagrams in FIGS. 10 and 11. In the description below, the same steps as the steps in the first embodiment are denoted by the same reference numerals of the first embodiment.

Figure 10:
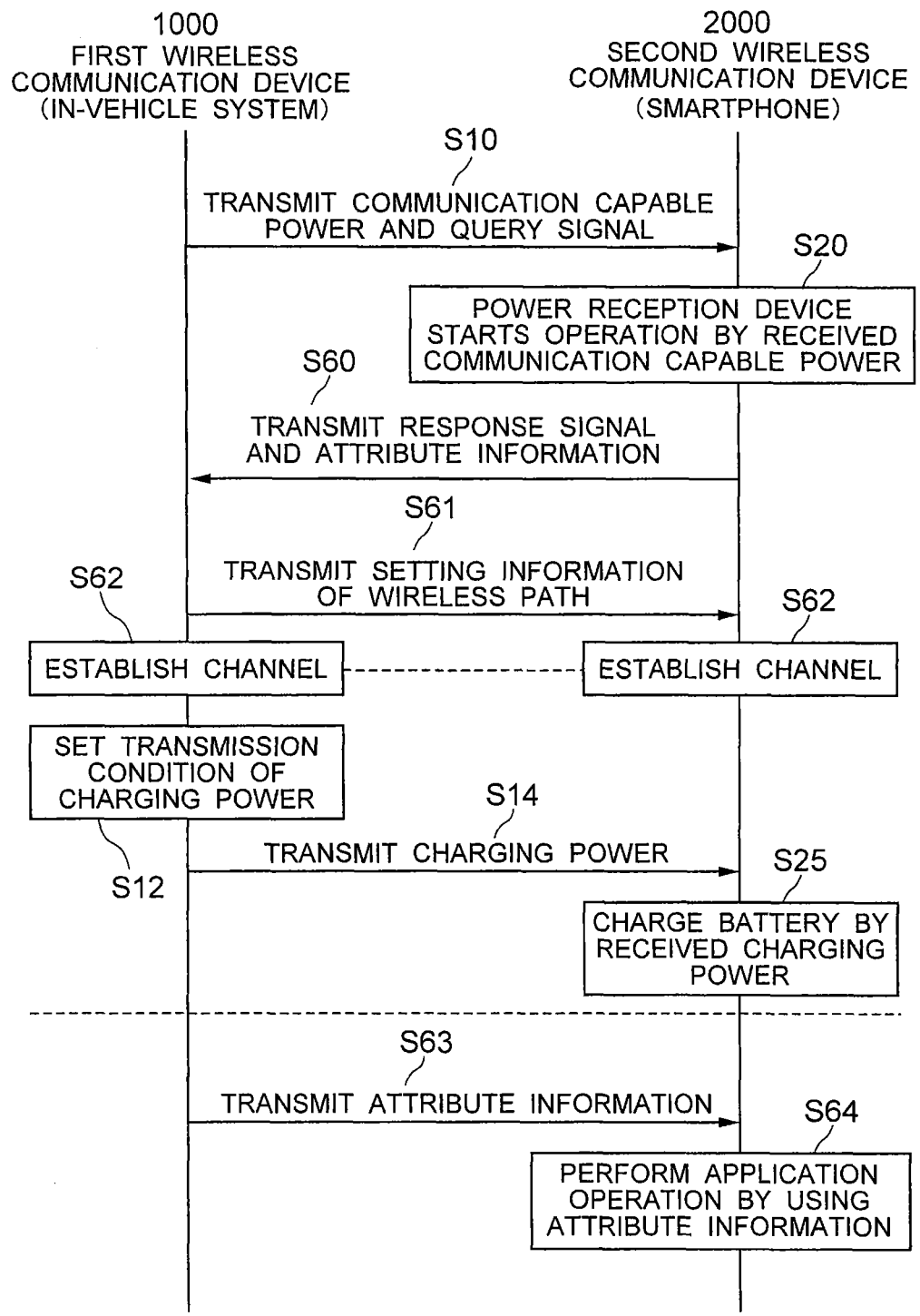
FIG. 10 is a sequence diagram showing the operation of the wireless communication system according to the sixth embodiment.

FIG. 10 is a sequence diagram showing the operation of the wireless communication system according to the sixth embodiment. FIG. 10 shows a case in which the first wireless communication device 1000 is an in-vehicle system. First, the power transmission device 10 of the first wireless communication device 1000 transmits the communication capable power, which can communicate with the power reception device 20 of the second wireless communication device 2000, and the query signal by using the wireless signal (step S10).

Next, the power reception device 20 starts the operation by the communication capable power received from the power transmission device 10 (step S20) and transmits the response signal and attribute information related to the attribute of the second wireless communication device 2000 by using the wireless signal in response to the query signal received from the power transmission device 10 (step S60). For example, the power reception device 20 transmits the attribute information of the smartphone (encryption key 1, owner name, amount of holding money, card number, and the like) to the in-vehicle system by using an encryption mechanism of the RFID (NFC) 28.

Next, the first wireless communication device 1000 causes the power transmission device 10 to transmit setting information of the wireless path between the first wireless unit 80 and the second wireless unit 90 according to the received attribute information (step S61). For example, the in-vehicle system transmits the setting information (SSID and encryption key 2) of the wireless path to the smartphone by using the same encryption mechanism of the RFID.

As a result, the first wireless communication device 1000 and the second wireless communication device 2000 establish a channel between the first wireless unit 80 and the second wireless unit 90 according to the setting information of the wireless path (step S62). In other words, a call (channel) of another wireless path is established, so that large data can be transmitted and received between the first wireless communication device 1000 and the second wireless communication device 2000. In the case of T-Jet, the channel establishing way is different. However, the channel may be appropriately established according to communication standards.

Next, the power transmission device 10 sets the transmission condition of the charging power (step S12).

Subsequently, the power transmission device 10 increases the intensity of the wireless signal to be transmitted according to the set transmission condition of the charging power and transmits the charging power by using the wireless signal (step S14).

Next, the power reception device 20 charges the battery 25 by the received charging power (step S25).

The processes of the steps S61 and S62 may be performed after the step S25.

Thereafter, the first wireless communication device 1000 and the second wireless communication device 2000 transmit and receive large data by using the channel between the first wireless unit 80 and the second wireless unit 90 as described below. At this time, the second wireless communication device 2000 operates by the power of the battery 25 or the power from the rectifier 22.

The first wireless communication device 1000, which is the in-vehicle system, transmits the attribute information of the in-vehicle system (gasoline shortage, speed, and the like) to the second wireless communication device 2000, which is the smartphone (step S63).

Next, the second wireless communication device 2000, which is the smartphone, performs an application operation by using the received attribute information (step S64). For example, the smartphone displays a position of a gas station on a car navigation system on the basis of the attribute information of the gasoline shortage.

Figure 11:
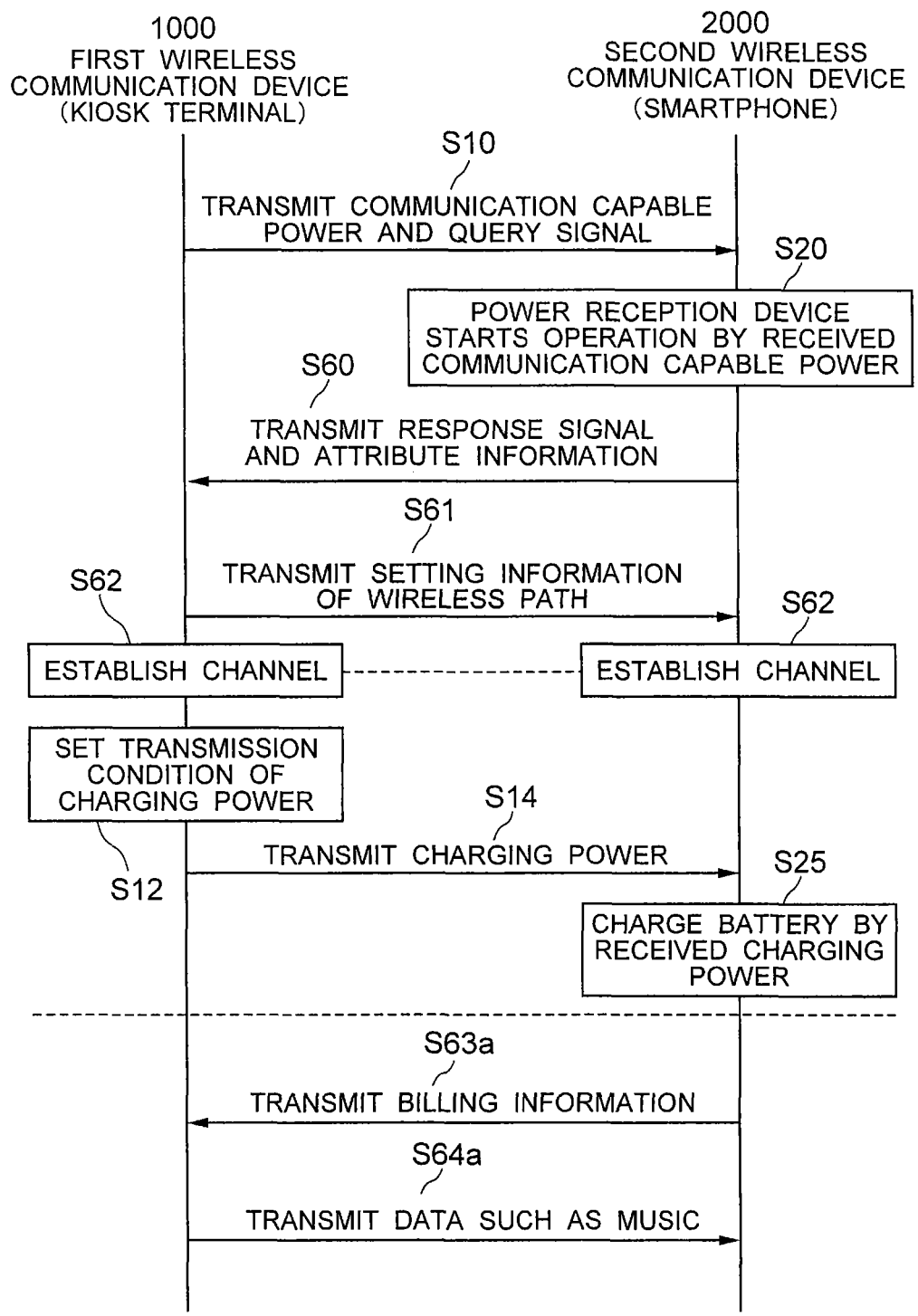
FIG. 11 is a sequence diagram showing another operation of the wireless communication system according to the sixth embodiment.

FIG. 11 is a sequence diagram showing another operation of the wireless communication system according to the sixth embodiment. FIG. 11 shows a case in which the wireless communication device 1000 is a kiosk terminal.

As shown in FIG. 11, in this case, it is possible to perform processes of the steps S63a and 64a instead of the processes of the steps S63 and S64 in FIG. 10. The other steps are the same as those in FIG. 10.

Specifically, the second wireless communication device 2000, which is the smartphone, transmits billing information (assuming Suica) or a card number (step S63a).

The first wireless communication device 1000, which is the kiosk terminal, transmits large data such as magazine, book, music, and movie (step S64a).

The billing information or the card number may be transmitted by using the RFID 28 in step S60.

As described above, according to the present embodiment, it is possible to charge the battery 25 by effectively using power in the same manner as in the first embodiment as well as to transmit and receive large data.

Seventh Embodiment

In the present embodiment, the charging power is decreased while the charging is performed.

Figure 12:
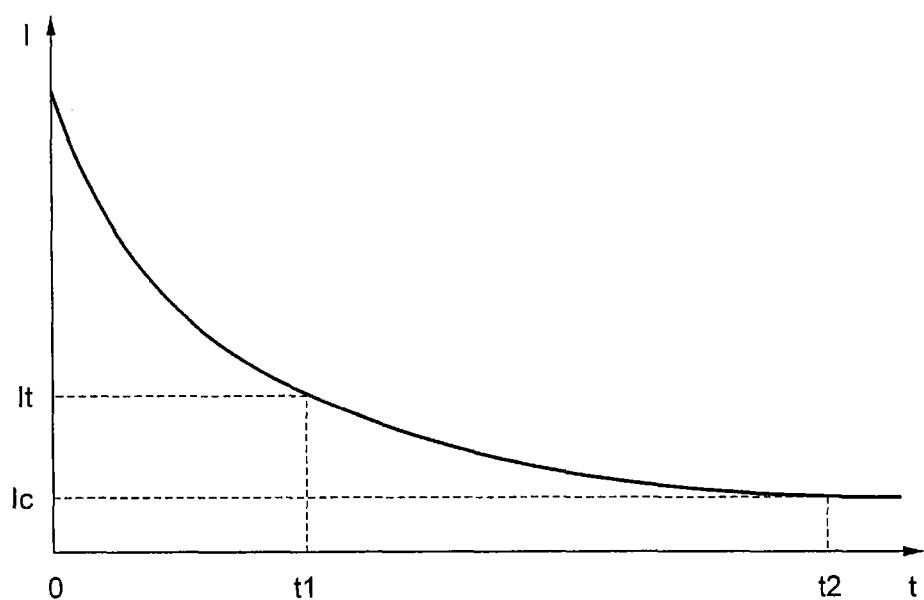
FIG. 12 is a diagram showing the charging characteristics of the charging system 100 according to the seventh embodiment.

FIG. 12 is a diagram showing the charging characteristics of the charging system 100 according to the seventh embodiment. The vertical axis in FIG. 12 represents a current I flowing from the charging circuit 24 of the power reception device 20 to the battery 25 and the horizontal axis represents an elapsed time t since the start of the charging of the battery 25. As shown in FIG. 12, as the time t elapses, the current I flowing from the charging circuit 24 to the battery 25 decreases. In other words, as the time elapses, the power used to charge the battery 25 decreases.

The charging circuit 24 outputs a current reduction signal when the current I flowing to the battery 25 becomes equal to or smaller than a threshold value It at time t1. When the RFID function circuit 26 receives the current reduction signal, the RFID function circuit 26 modulates the wireless signal and transmits a charging power control signal from the reception side coil 21. The control unit 11 of the power transmission device 10 reduces the charging power when the reception circuit 15 receives the current reduction signal.

After the time t1, the battery 25 is charged by using the reduced charging power. At time t2, the current I flowing from the charging circuit 24 to the battery 25 becomes a substantially constant value Ic. As described in the first embodiment, the charging circuit 24 detects the above phenomenon and outputs the completion signal S1.

As described above, according to the present embodiment, the charging power transmitted by the power transmission device 10 is reduced while the charging is performed, so that it is possible to reduce useless power more than that of the first embodiment and the like.

A plurality of threshold values may be provided and the control of the charging power may be performed a plurality of times.

According to the embodiments described above, it is possible to effectively use the power to charge the battery 25.

For example, in the above embodiments, an example is described in which the query signal and the response signal are transmitted and received by using the amplitude-modulated wireless signal. However, it is not limited to this. For example, phase modulation, frequency modulation, and the like may be used.

In the above embodiments, an example is described in which the drive control circuit 12 modulates the wireless signal by the ON/OFF of the NMOS transistors 36 and 37. However, it is not limited to this. For example, the wireless signal may be modulated by controlling the voltage of the variable voltage 31 without using the inverter 33, the buffer 34 and 35, the NMOS transistors 36 and 37, and the resistances 38 and 39.

In the above embodiments, an example of the circuit configuration of the power transmission device 10 is described with reference to FIG. 2. However, it is not limited to this. For example, when the phase modulation, the frequency modulation, or the like is used, different circuits may be used as the drive control circuit 12 and the RFID reception circuit 15.

In the above embodiments, an example is described in which the transmission and the reception of the power and the command between the transmission side coil 14 and the reception side coil 21 is performed by a coupling method. However, the transmission and the reception may be performed by a magnetic field method.

While some embodiments of the present invention have been described, these embodiments are presented as examples and are not intended to limit the scope of the invention. These embodiments can be implemented in other various forms, and various omissions, replacements, and modifications can be made without departing from the scope of the invention. These embodiments and modifications thereof are included in the scope and gist of the invention and also included in the inventions described in the claims and the equivalent range of the claims.

The invention claimed is:

1. A power transmission device configured to transmit a wireless signal to a power reception device, the power reception device charging a battery obtained from the received wireless signal, transmitting a charge completion signal when a charge of the battery is completed, and transmitting a response signal in response to a query signal included in the wires signal, the power transmission device comprising:
  a transmission side coil configured to transmit the wireless signal;
  a drive circuit configured to drive the transmission side coil;
  a drive control circuit configured to control the drive circuit to control intensity and modulation of the wireless signal;
  a reception circuit configured to receive the response signal and the charge completion signal from the wireless signal modulated by the power reception device through the transmission side coil; and
  a controller configured to
   control, when the reception circuit does not receive the response signal or the reception circuit receives the charge completion signal, the drive control circuit to transmit communication capable power that makes it possible to communicate with the power reception device and the query signal from the transmission side coil by the wireless signal, and
   control, when the reception circuit receives the response signal and the reception circuit does not receive the charge completion signal, the drive control circuit to transmit charging power capable of charging the battery of the power reception device by the wireless signal from the transmission side coil, the charging power being higher than the communication capable power,
  wherein the controller supplies an intensity control signal for controlling intensity of the wireless signal and a modulation control signal for controlling modulation of the wireless signal to the drive control circuit,
  the drive control circuit comprises:
   a variable power supply whose voltage is controlled according to the intensity control signal;
   a first NMOS (N-type Metal Oxide Semiconductor) transistor, the modulation control signal being inputted to a gate thereof, a source thereof being grounded, and a drain thereof being connected a first end of the transmission side coil;
   a second NMOS transistor, the modulation control signal being inputted to a gate thereof, a source thereof being grounded, and a drain thereof being connected a second end of the transmission side coil; and
   an oscillator configured to output an oscillation signal,
  the drive circuit comprises:
   a first drive inverter, the oscillation signal being inputted to an input terminal thereof, an output terminal thereof being connected to the first end of the transmission side coil, and the voltage form the variable power supply being supplied as a power supply; and
   a second drive inverter, an inversed single of the oscillation signal being inputted to an input terminal thereof, an output terminal thereof being connected to the second end of the transmission side coil, and the voltage form the variable power supply being supplied as a power supply.

2. The power transmission device of claim 1, wherein the reception circuit comprises:
 a transmission side rectifier configured to rectify the wireless signal from the transmission side coil; and
 a comparator configured to compare a signal rectified by the transmission side rectifier with a reference voltage to output a comparison result to the controller, the comparison result comprising the response signal and the charge completion signal.

3. A wireless communication system comprising:
 a first wireless communication device comprising a power transmission device and a first wireless unit, and the power transmission device configured to transmit a wireless signal to a power reception device, the power reception device charging a battery obtained from the received wireless signal, transmitting a charge completion signal when a charge of the battery is completed, and transmitting a response signal in response to a query signal included in the wires signal;
 the power transmission device comprising,
  a transmission side coil configured to transmit the wireless signal,
  a drive circuit configured to drive the transmission side coil,
  a drive control circuit configured to control the drive circuit to control intensity and modulation of the wireless signal,
  a reception circuit configured to receive the response signal and the charge completion signal from the wireless signal modulated by the power reception device through the transmission side coil, and
  a controller configured to
   control, when the reception circuit does not receive the response signal or the reception circuit receives the charge completion signal, the drive control circuit to transmit communication capable power that makes it possible to communicate with the power reception device and the query signal from the transmission side coil by the wireless signal, and
   control, when the reception circuit receives the response signal and the reception circuit does not receive the charge completion signal, the drive control circuit to transmit charging power capable of charging the battery of the power reception device by the wireless signal from the transmission side coil, the charging power being higher than the communication capable power;
 a second wireless communication device comprising a power reception device and a second wireless unit configured to be capable of wireless-communicating with the first wireless unit, the second wireless communication device operating by the power from the battery or the rectifier,
 wherein the power reception device of the second wireless communication device transmits attribute information which relate to an attribute of the second wireless communication device when the power reception device transmits the response signal,
 the first wireless communication device makes the power transmission device to transmit, to the power transmission device, setting information of a wireless pass between the first wireless unit and the second wireless unit according to the received attribute information, and
 the first wireless communication device and the second wireless communication device communicate with each other by establishing a channel between the first wireless unit and the second wireless unit according to the setting information of the wireless pass,
 the power reception device of the second wireless communication device configured to receive a wireless signal from a power transmission device, the power transmission device transmitting communication capable power and a query signal by the wireless signal when a response signal is not received or a charge completion signal is received, and transmitting charging power higher than the communication capable power by the wireless signal when the response signal is received and the charge completion signal is not received, the power reception device of the second wireless communication device comprising:

a reception side coil configured to receive the wireless signal;

a rectifier configured to rectify the wireless signal received by the reception side coil to generate power;

a charging circuit configured to charge a battery with the power from the rectifier and to output a completion signal when charge of the battery completes; and an RFID function circuit configured to demodulate the wireless signal received by the reception side coil,
to transmit, from the reception side coil, the response signal by modulating the wireless signal when the query signal is detected from the wireless signal, and
to transmit, from the reception side coil, the charge completion signal by modulating the wireless signal when the completion signal is received from the charging circuit.

4. The device of claim 1, wherein
the response signal comprises identification information of the battery, and
the controller controls the charging power based on the identification information.

5. The device of claim 4, wherein
the controller comprises a table comprising a plurality of pairs, the identification information and charge characteristic information being associated with each other in each of the pairs, and the controller controls the charging power according to the charge characteristic information corresponding to the identification information, and
the charge characteristic information comprises a relationship between the charging power and time.

6. The device of claim 1, wherein the controller controls the drive control circuit to transmit the query signal from the transmission side coil by the wireless signal intermittently while the charging power is being transmitted.

7. The device of claim 1, wherein
the controller controls the drive control circuit to transmit, in addition to the charging power, a signal for writing a number of times of charging from the transmission side coil by the wireless signal, and
the power reception device adds a number of times of charging by 1 and stores the added number of times of charging when the receiving the signal for writing the number of times of charging, and when the number of times of charging exceeds a first number of times, the power reception device notifies a user accordingly.

8. The device of claim 1, wherein
the controller obtains identification information of the battery of a plurality of power reception devices through the transmission side coil and the reception circuit by using an anti-collision function, and
the controller controls the charging power according to the obtained identification information of the battery of the plurality of power reception devices.

9. The device of claim 1, wherein a first frequency of the wireless signal used for transmitting and receiving the communication capable power and the charging power is different from a second frequency of the wireless signal used for transmitting and receiving the query signal.

* * * * *